United States Patent [19]

Goavec

[11] Patent Number: 5,024,066
[45] Date of Patent: Jun. 18, 1991

[54] INSTALLATION FOR THE MAKING OF FOOD PRODUCTS, IN PARTICULAR EXPANDED FOOD PRODUCTS, SUCH AS ICE CREAM

[75] Inventor: Jean-Jacques Goavec, Alencon, France

[73] Assignee: Goavec S.A., Alencon, France

[21] Appl. No.: 247,919

[22] Filed: Sep. 22, 1988

[51] Int. Cl.$^5$ .................................... A23G 9/20
[52] U.S. Cl. .............................. 62/306; 62/342; 366/292; 366/309
[58] Field of Search ............... 62/342, 343, 306; 366/149, 292, 309–313; 261/21

[56] References Cited

U.S. PATENT DOCUMENTS

| 797,512 | 8/1905 | Glauser | 62/342 X |
|---|---|---|---|
| 1,972,253 | 9/1934 | Vogt | 62/342 X |
| 2,131,510 | 9/1938 | Gray | 62/114 |
| 2,132,364 | 10/1938 | Thompson | 62/114 |
| 2,278,340 | 3/1942 | Weinreich et al. | 62/342 X |
| 2,538,716 | 1/1957 | Wakeman | 62/342 X |
| 2,576,842 | 11/1951 | Lehner | 99/136 |
| 2,713,253 | 7/1955 | Chandler | 67/114 |
| 2,959,932 | 11/1960 | Spergel et al. | 62/136 |
| 3,104,975 | 9/1963 | Bowman | 99/81 |
| 3,402,562 | 9/1968 | Menzel | 62/306 X |
| 3,711,296 | 1/1973 | LaWarre, Sr. | 99/80 R |
| 3,719,056 | 3/1973 | Hock et al. | 62/70 |
| 3,817,396 | 4/1989 | Menzel | 62/306 |
| 3,823,571 | 7/1974 | Smith et al. | 62/136 |
| 4,022,918 | 5/1977 | Miller | 426/446 |
| 4,157,017 | 6/1979 | Reid | 62/135 |
| 4,275,567 | 6/1981 | Schwitters | 62/63 |
| 4,316,490 | 2/1982 | Meyer | 141/9 |

FOREIGN PATENT DOCUMENTS

| 0257125 | 3/1988 | European Pat. Off. . |
| 2153959 | 3/1972 | Fed. Rep. of Germany . |
| 1313377 | 12/1961 | France . |
| 2250566 | 6/1975 | France . |
| 2507869 | 12/1982 | France . |
| 2572899 | 3/1986 | France . |
| 2588160 | 4/1987 | France . |

Primary Examiner—William E. Tapolcai
Attorney, Agent, or Firm—Hughes & Multer

[57] ABSTRACT

An installation for the making of food products, particularly expanded food products, such as ice cream. There is a freezing system to cool and homogenize the product which is then transported to a packing system. The freezing system comprises a refrigerated cylindrical chamber with agitating means mounted for rotation inside the cylinder. The agitating means comprises an Archimedes' screw fitted on its periphery with scraper knives aligned in the direction of the length of the screw and touching the internal surface of the double walled cylindrical chamber.

24 Claims, 5 Drawing Sheets

FIG_7

FIG_8

FIG_9

INSTALLATION FOR THE MAKING OF FOOD PRODUCTS, IN PARTICULAR EXPANDED FOOD PRODUCTS, SUCH AS ICE CREAM

Installation for the making of food products, particularly expanded food products, such as ice cream.

The invention concerns an installation for the making of food products, particularly expanded food products, such as ice cream.

The invention concerns in particular an installation for the making of food products, particularly of expanded food products such as ice creams, comprising a freezing system to cool and homogenise the product before carrying it to the packing plants, this freezing system being made up of a cylindrical chamber forming a double casing inside which circulates a cooling fluid and agitating means mounted for rotation inside the cylinder.

Installations of this type are already known, which comprise a refrigerated cylindrical enclosure with double walls, inside which are arranged agitators in order to stir the product which is introduced into the enclosure, during its cooling.

It has become apparent however that the nature of this agitation is very important for the speed of the freezing for the homogenisation of the frozen product, as well as for the structure of this product of which the particles of the frozen product, which determine the essential quality of the product, vary greatly as a function of the agitation which is carried out during freezing.

It is also known to use agitators or beaters, made up from stems and longitudinal scraper knives (see U.S. Pat. No. 2,132,364) or by helicoidal beaters (see U.S. Pat. Nos. 4,275,567 and 2,713,253) but the known devices do not allow one to obtain to a sufficient degree the qualities indicated above for the frozen products and, particularly, the frozen particles are of a relatively large size, the freezing time is significant and the homogenity is defective, unless of course one choses to improve this homogenity by increasing the mixing time equally reducing the output.

The invention intends to perfect the above art and concerns to this end and installation characterised in that the stirring means of the cylindrical chamber comprise an Archimedes' screw furnished on its peiphery with scraper knives positioned in the direction of the length of the screw and touching the internal surface of the double-wrapped cylindrical chamber.

Other characteristics of the invention are delt with in the other claims.

The invention will be described in more detail with the help of the attached drawings in which.

Figure 1:
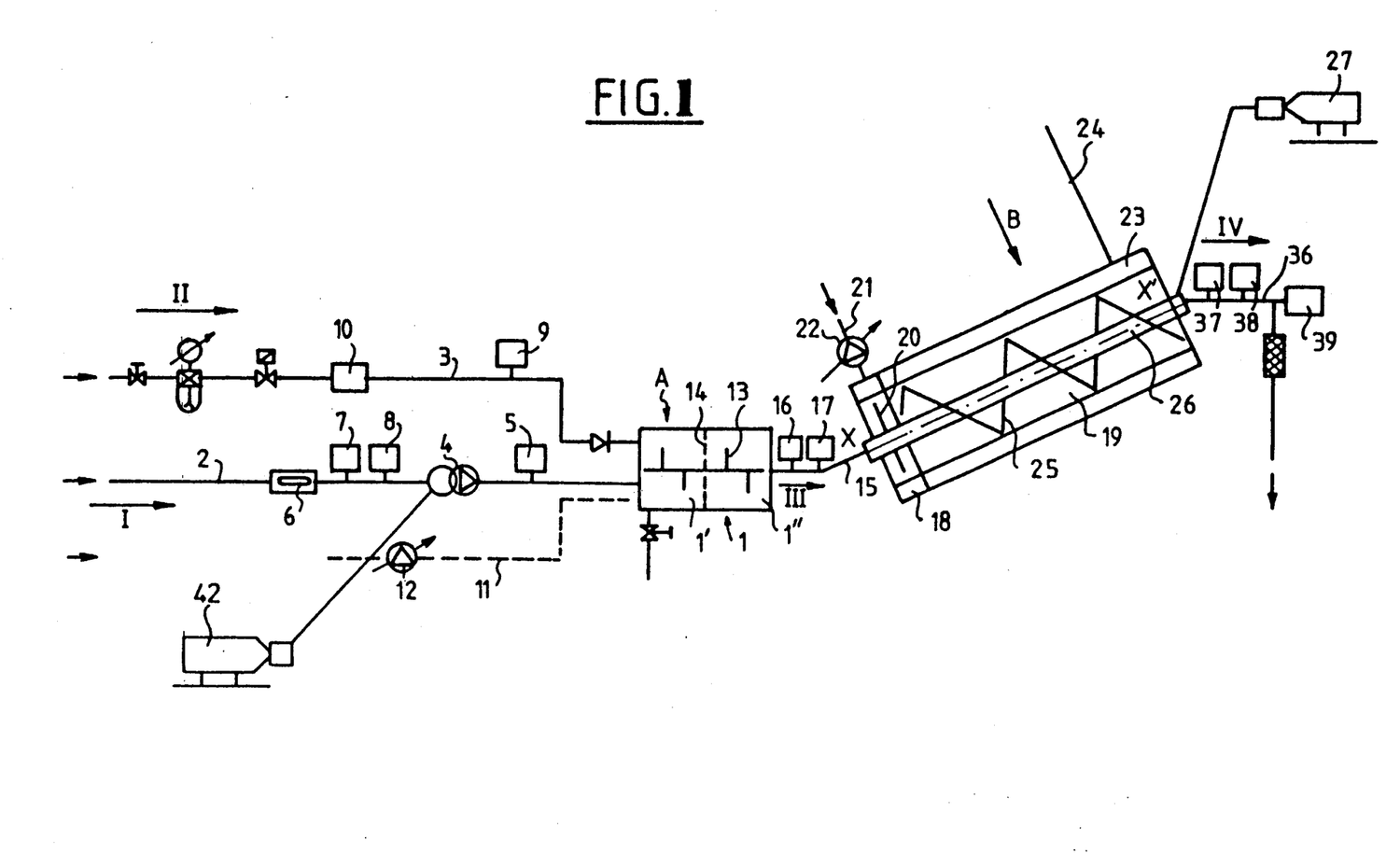
FIG. 1 is a schematic diagram of the installation.

According to FIG. 1 the installation of the invention comprises principally an expanding device A and a freezing system B.

The expanding device A is constituted by a closed enclosure 1 into which leads a duct 2 for feeding the initial mixture (arrow I) as well as a gas feed duct 3, particularly for expanding air (arrow II).

The mixture introduced into the enclosure 1 by the feed duct 2 is made up of water, milk, sugar, flavour etc. ... ; it is delivered by a volumetric pump 4 whose output is constantly measured by a flow sensor 5. Temperature sensors 7 and pressure sensors 8 measure the characteristics of this mixture continuously. A window 6 permits the observation of the initial mixture flowing in the feed duct 2.

The pressure of the gas in duct 3 is measured by a sensor 9 while a doser, gas injector, or mass flow meter 10, described later, permits the adjustment at any time of the quantity of gas delivered.

A secondary feed duct 11 supplies an additional liquid, more or less viscous (colouring, fruit pulp. . . .) whose flow rate is controlled by a dosing pump 12.

The enclosure 1 comprising essentially a refrigerating jacket not shown, is fitted with an agitating system using moving elements 13 to mix homogenously the different constituents arriving through the ducts 2, 3 and 11.

The enclosure 1 may be separated into two compartments 1' and 1" by a finely perforated grill 14 to promote the mixing of the different constituents.

After a very brief rest period, the expanded and homogenised mixture leaving the expanding device A according to the arrow III is propelled towards the freezing system B by the volumetric pump 4 through as short as possible a tube 15, equipped with sensors for temperature 16 and pressure 17.

The expanding device A may be directly connected to the freezing system B.

According to FIG. 1, the freezing system comprises, going from upstream to downstream in the direction of circulation III of the mixture, an auxiliary chamber 18 as well as a cooling chamber 19. The chambers are cylindrical and coaxial.

The uncooled auxiliary chamber 18 is equipped with an axial agitating system with paddles 20; it receives a duct 21 feeding solid particles connected to a dosing hopper 22.

The agitating system 20 maintains the solid particles introduced by the duct 21 in suspension without risking their deterioration; it is, to this end, essential that the agitation should not be too intensive.

The cooling chamber 19 is fitted with a double casing 23 connected to a circuit 24 circulating a cooling fluid in order to allow a partial freezing in the shape of small crystals, of a part of the water contained in the mixture, to a temperature sufficiently low for the product leaving the freezing system B according to arrow IV to have a sufficiently stable texture and to have a temperature low enough to be able to be directly packed and stored in a cold store.

The internal part of the cooling chamber 19 contains a moveable Archimedes' screw 25 rotating about a shaft 26 coinciding with the axis x—x' and driven by a variable speed motor 27, to assure the transportation of the products.

Figures 3, 4:
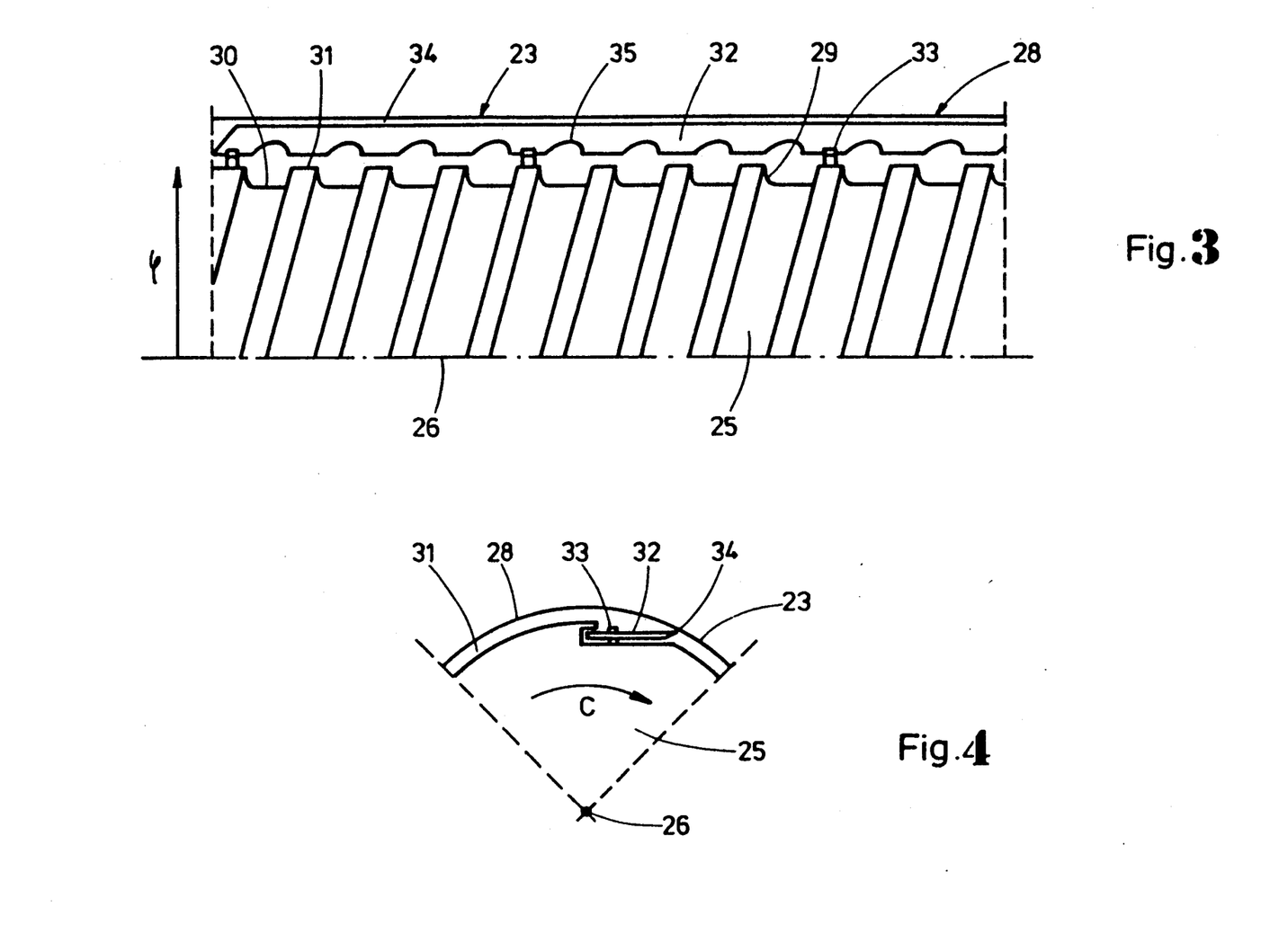
FIG. 3 is an axial section of half of the Archimedes' screw.
FIG. 4 is a schematic partial transverse section of the Archimedes' screw.

The configuration of the Archimedes' screw is shown in more detail in FIGS. 3 and 4 in which only the internal wall 28 of the double casing 23 has been shown.

To make it easier to understand, the free distance between the external surface 29 of the screw 25 and the internal wall 28 of the double casing 23, has been exaggerated; in reality, the screw is adjusted with some tenths or some millimeters of play close to the inside of the exchanger cylinder.

According to FIG. 3, the sunken grooves 30 between the threads 31 are relatively shallow in relation to the diameter of the screw 25 and have undergone a preliminary sanding treatment so that the external surface 29 of the screw should not be smooth but grained so that a film of water forms on its which stops the fatty matter in the mixture separating out and forming butter.

Longitudinal scraper knives 32 articulated on the threads 31, particularrly through the medium of pins 33, scrape the internal surface 28 of the cylinder 23 with their external sharpened ends.

According to FIG. 3, taking account of the articulation of the knives, when the screw 25 turns according to arrow C, these are flattened against the wall 28 under the effect of centrifugal force which assures optimum scraping.

The profiled notches 35, provided on the inside surface of the scraper knives 32, prevent the product from "clogging" between them and the grooves 30 of the thread and perfect the homogenisation and the expansion of the product.

According to FIG. 1, the freezing system B is slightly inclined to relation to the horizontal; it could equally be horizontal without departing from the scope of the invention; the frozen mixture leaving this system tangentially according to arrow IV is transmitted by an exit channel 36 fitted with temperature, pressure and viscosity sensors 37, 38 and 39, to the packing and storing means.

The installation described above is regulated by a servo-control system of which the principal part is a central computer 40.

At the start of the fabrication process, the computer 40 receives the given values concerning for example the quantity of gas, in particular of expanding air, to be introduced through the feed duct 3 in the enclosure 1 for a given flow of products in the feed duct 2, the quantity of additives to be added through the ducts 11 or 21, the final output of the product leaving through the channel 36, the temperature and the viscosity of the same, or even the feed pressure into the packing system.

Figure 2:
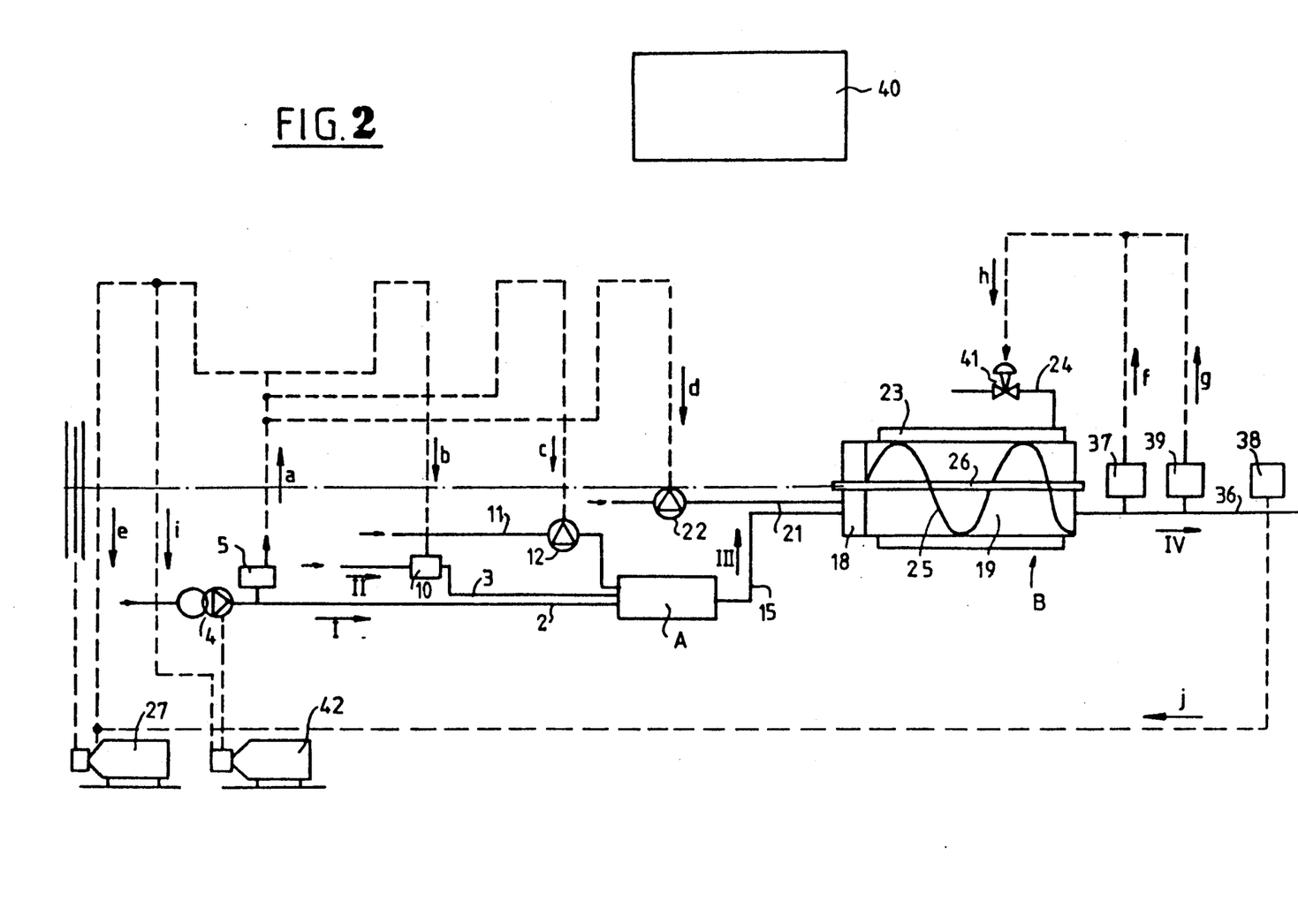
FIG. 2 is a diagram showing the different regulating loops of the installation in FIG. 1.

From these given values, and from the magnitudes supplied by the sensors already described, several control loops are established. The most important of these loops concerns the regulation of the expansion; to this end, the output sensor 5 mounted in the feed duct 2 below the volumetric pump 4, transmits its information to the central computer 40 (signal a); in response, this supplies a command signal (signal b) to the mass flow meter 10 of the feed duct 3 for the expanding gas, in particular air, to adjust the quantity of gas introduced at the expansion device A to a predetermined value; from the information a transmitted by the flow sensor 5, the central computer 40 commands equally (signals c and d) the quantity of additives to be introduced into the channels 11 and 21, as well as, (signals e and i), the speeds of rotation of the drive motor 27 of the shaft 26 of the screw 25 and of the drive motor 42 of the volumetric pump 4 so that the output of the product at the exit of the freezing system B in the duct 36 corresponds to the predetermined output.

Another control loop is derived from the values of temperature and viscosity (signals f and g) transmitted to the computer 40 by the sensors 37 and 39 of the duct 36. In response, the computer 40 transmits a control signal h to a suction valve 41 in the refrigeration circuit 24 to control the characteristics of the final product.

A last control loop shown in FIG. 2 corresponds to information transmitted to the computer 40 by the pressure sensor 38. In response, this furnishes a control signal j to the motor 27. The response to it can be a change of exit pressure to the packing station, without however altering the exit flow which is then regulated by the order given by the computer 40 according to the arrow i, acting on the motor 42 of the pump 4.

It should also be stressed that the description above should only be seen as one embodiment of the invention and that this could with minor alterations be applied to installations of a somewhat different nature, in particular those in which the expansion of the final product is very small—even none—or in which the cooling system is replaced by a heating system (by modifying the double casing in which the thermal fluid circulates) or even to installations for the treatment of very viscous products (sauce, jam . . . ) which may contain solid and fragile particles (pieces of mushroom. . . ).

Figure 5:
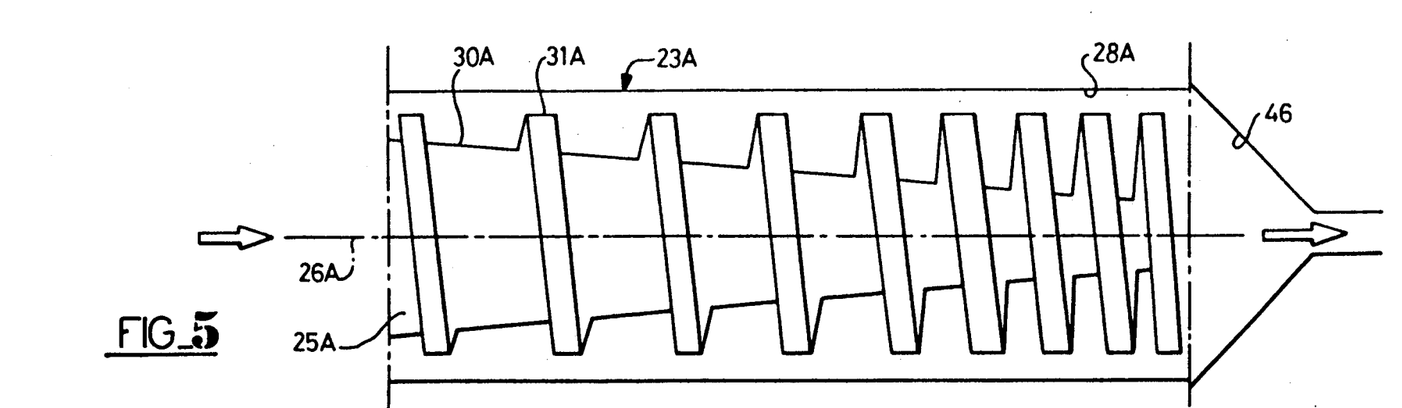
FIG. 5 is a view of the Archimedes' screw according to a first embodiment of the present improvement.

According to FIG. 5, the installation comprises an Archimedes' screw 25A turning about an axis 26A. This screw has a thread 31A whose depth 30A increases in the direction of flow of the product indicated by the arrow to the left of the figure, that is to say from left to right. According to a preferred embodiment, the depth of the thread increases in relation to the reduction of the pitch, so as to maintain a constant section for the volume transported along the entire length of the screw. In order to reduce frictional forces and to accompany the progress of the product when it leaves the freezing system, the wall 46 of the exit of the screw is cone-shaped.

This figure also shows the internal wall 28A of the freezing system as well as the double casing 23A which defines this wall of the cylinder forming the freezing system. This figure does not show the knives placed between the screw 25A and the internal wall 28A as that has already been described in the main patent.

Figure 6:
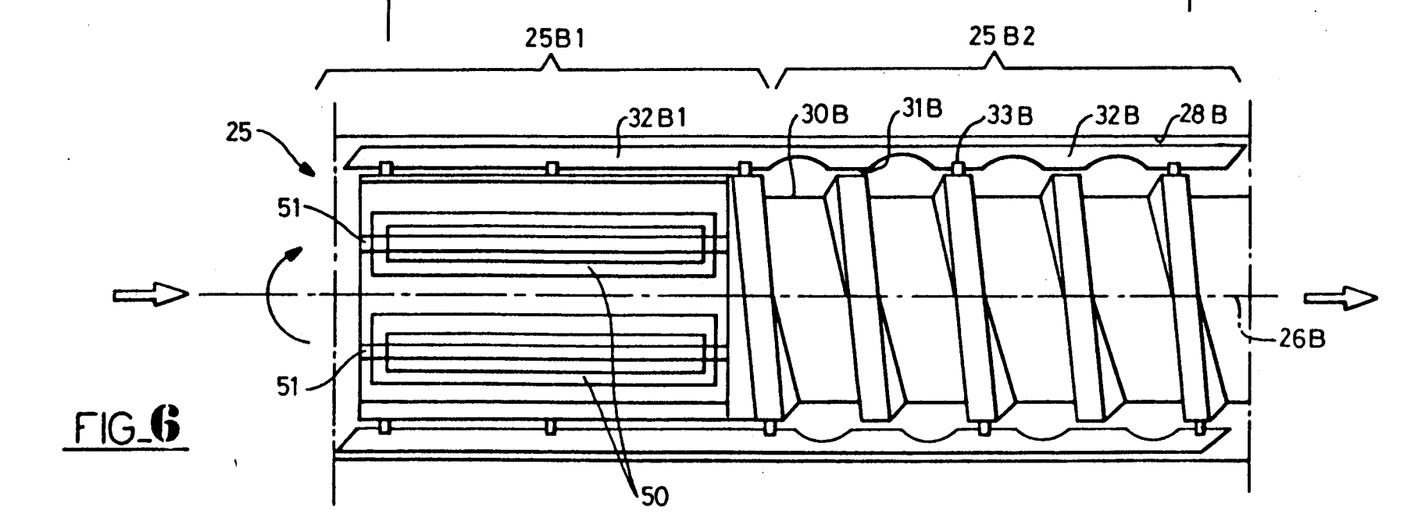
FIG. 6 is a view of the Archimedes' screw according to a second embodiment of the present improvement.

FIG. 6 shows another embodiment of a screw 25B. This screw comprises two parts 25B1 and 25B2. Part 25B1 is situated upstream and the part 25B2 downstream in the direction of circulation of the products shown by the arrows.

The part 25B2 comprises a thread 31B defining cavities 30B. A longitudinal scraper knife 32B is fixed to the screw by means of pins 33B.

The upstream part 25B1 of the screw comprises central, moving elements 50 constituted by paddles mounted for rotation on axes 51. These paddles may turn freely about their axes.

The paddles are only one embodiment and all other types of mixing elements may be envisaged.

This figure also shows schematically the internal wall 28B of the cylinder of the freezing system, the wall being shown schematically at a certain distance from the edge of the knife. Moreover, the knife 32B extends as far as the paddles 50 by means of a part of the knife 32B1 not having the anti-clogging notches as in the part 25B2 of the screw.

Figure 7:
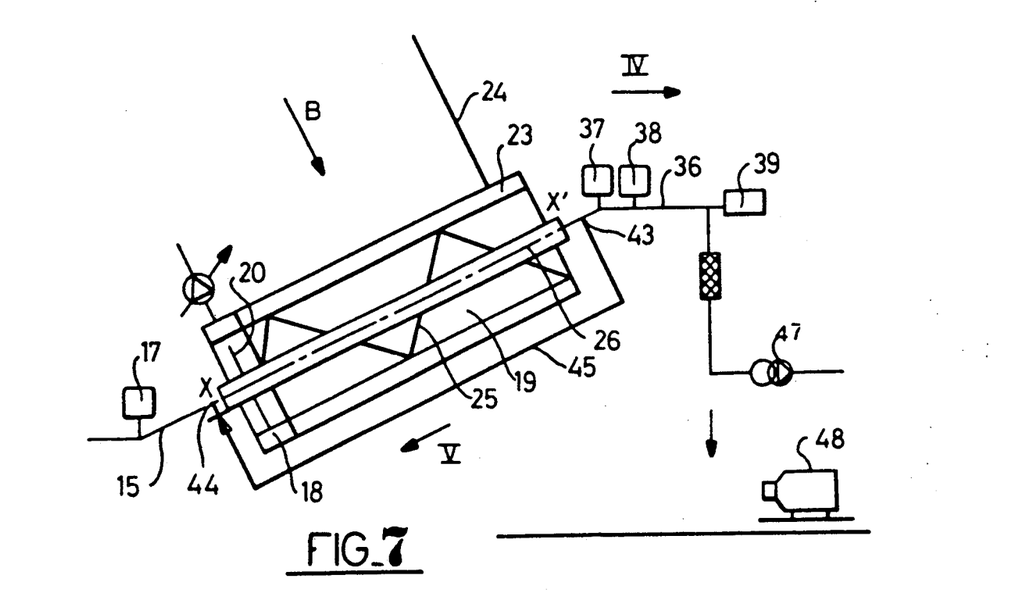
FIG. 7 is a schematic view of the freezing system equipped with means of recirculating the product according to another characteristic of the present improvement, FIGS. 8 and 9 schematically represent two embodiments of the expanding device.

FIG. 7 shows another variation of the invention. This variation concerns the freezing system which is not shown in detail, as the different accessories carry the references of the main patent. The variation is characterised by the junction 43 at the exit of the chamber 19 returning again to the entrance 44 of this chamber by way of a return duct 45. This permits the withdrawal of part of the frozen products at the exit in order to re-inject the already frozen flakes or products into the product at the entrance of the chamber 19 and to seed this product with the small crystals of the already frozen product. This accelerates the freezing process and encourages the finest division of the frozen product. It should be noted that the entrance 44 can be sited either on the feed duct 15 or open directly into the chamber 19.

According to this same variation, the expanded and frozen final product is delivered by a volumetric pump 47, rotated by its variable speed motor 48, assuring the transport of the product towards the freezing system at the desired flow. This pump is situated downstream of the recirculating junction in the direction of the passage of the product.

Another version is equally possible, where a non-return valve takes the place of the exit pump 47. This non-return valve is not shown in FIG. 7.

Figure 8:
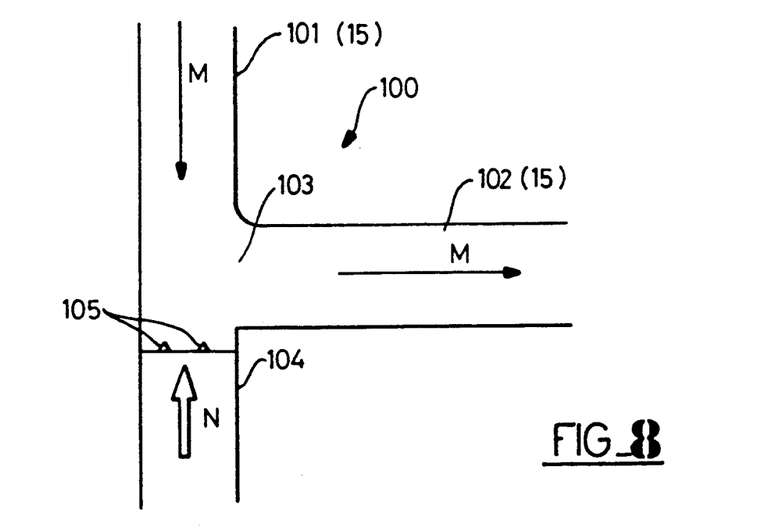

FIG. 8 shows a first variation of the expanding device 100 constituted by the part 101 of the feed duct 15 for the product to be frozen and by the part 102 of this same duct 15. The parts 101 and 102 are connected by an elbow 103 at which point a duct 104 discharges with injectors for air or expanding gas 105. The circulation of the product to be frozen is shown by the arrows M. The circulation of the expanding gas (air) is shown by the arrow N. In the case of FIG. 8, the injection of air by the injectors 105 is made in the opposite direction to the circulation of the products in the part 101 and at the level of the elbow 103.

Figure 9:
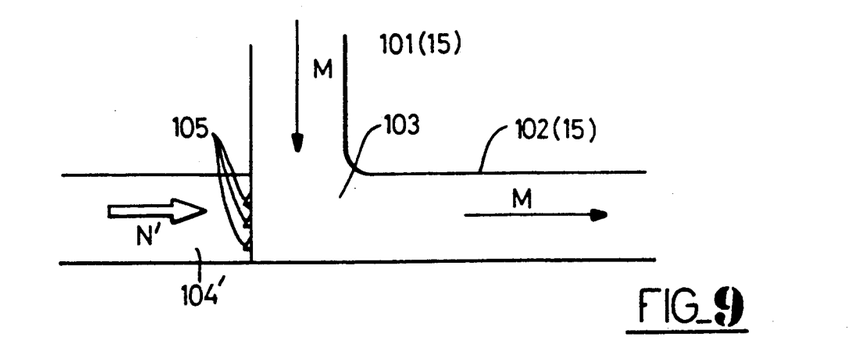

On the other hand, in the variation shown in FIG. 9, which, for the ducts 101, 102 and the elbows 103 corresponds to the variation in FIG. 8, the difference rests in the arrangement of the duct 104' which is aligned with the exit duct 102 and not with the entrance duct 101. In this case equally, the air which circulated on the direction of the arrow N' is injected by injectors 105'. The injection is made in the same direction as the arrow M and not as a counter-current.

Although the invention has been described above with regard to the making of frozen products, it is entirely possible to circulate a heat carrying fluid in the freezing system which then plays the role of a heating system, all the functions and characteristics of the invention remaining identical or similar. The heat carrying fluid can, for example, be hot water or steam.

I claim:

1. An installation for the making of food products, in particular expanded food products such as ice cream, comprising a freezing system (B) to cool and homogenise the product before transportation to a packing system, this freezing system being made up of a cylindrical chamber forming a double-casing, inside which a refrigerating fluid circulates, and agitating means, which is mounted for rotation inside the cylinder, the installation characterized in that the agitating means in the cylindrical chamber comprises an Archimedes' screw (25) the surface of which is grained and which is provided on its periphery with scraper knives (32) aligned in a longitudinal direction of the screw and touching an internal surface of the cylindrical chamber.

2. An installation for the making of food products, in particular expanded food products such as ice cream, comprising a freezing system (B) to cool and homogenise the product before transportation to a packing system, this freezing system being made up of a cylindrical chamber forming a double-casing, inside which a refrigerating fluid circulates, and agitating means, which is mounted for rotation inside the cylinder, the installation characterized in that the agitating means in the cylindrical chamber comprises an Archimedes' screw (25) provided on its periphery with scraper knife means (32) aligned in a longitudinal direction of the screw means and touching an internal surface of the cylindrical chamber, the installation further characterized in that the double-walled cylindrical chamber has, upstream in the direction of circulation of the product, an auxiliary cylindrical chamber (18) fitted with agitating means (20) an axis of which is coaxial with a shaft means of the screw.

3. An installation for the making of food products, in particular expanded food products such as ice cream, comprising a freezing system (B) to cool and homogenise the product before transportation to a packing system, this freezing system being made up of a cylindrical chamber forming a double-casing, inside which a refrigerating fluid circulates, and agitating means, which is mounted for rotation inside the cylinder, the installation characterized in that the agitating means in the cylindrical chamber comprises an Archimedes' screw (25) provided on its periphery with scraper knife means (32) aligned in a longitudinal direction of the screw and touching an internal surface of the cylindrical chamber, the installation further characterized in that the freezing system is fed with an expanded product issuing from an expanding device (A) itself fed with the non-expanded product and with an expanding gas, this expanding device comprising a closed enclosure (1) in which an agitator means (13) is driven in rotation.

4. The installation according to claim 3, characterized in that the enclosure (1) of the expanding device (A) is divided into two compartments by a finely perforated grill (14).

5. The installation according to claim 3, characterized in that the screw (25A) includes a thread means (31A) a depth (30A) of which increases in a direction of advancement of the product.

6. An installation according to claim 5, characterized in that the depth (30A) of the thread means increases in relation to a reduction in pitch of the screw (25A), in such a way that a volume transported remains constant along a whole length of the screw (25A).

7. An installation accordingly to claim 6, characterized in that an exit of the screw is cone-shaped (46), in the direction of advancement of the product.

8. An installation for the making of food products, in particular expanded food products such as ice cream, comprising a freezing system (B) to cool and homogenise the product before transportation to a packing system, this freezing system being made up of a cylindrical chamber forming a double-casing, inside which a refrigerating fluid circulates, and agitating means, which is mounted for rotation inside the cylinder, the installation characterized in that the agitating means in the cylindrical chamber comprises an Archimedes' screw (25) provided on its periphery with a scraper knife means (32) aligned in a longitudinal direction of the screw and touching an internal surface of the cylindrical chamber, the installation further characterized in that it comprises a servo-control system comprising a flow sensor means (5) mounted on a feed duct means (2) for a non-expanded food product downstream of a volumetric pump (4), this flow sensor means (5) being connected to a computer means (40) in order to furnish it with information in response to which this computer means controls a doser-injector of gas or mass flow meter (10) provided in a feed duct means (3) for expanding gas, in order to adjust a quantity of gas to a predetermined value corresponding to a predetermined percentage of expansion of the product obtained at an exit from the freezing system (B).

9. An installation according to claim 8, characterized in that the screw (25) and the volumetric pump means (4) are driven by variable speed motor means, a rotation of these motor means being controlled from the computer means (40) by way of information transmitted to it by the flow sensor means (5) in such a way as to adjust to a given value the flow of the expanded product, in particular of ice cream, obtained at the exit from the freezing system (B).

10. An installation according to claim 8, characterized in that the servo-control system comprises temperature, pressure and viscosity sensors (7, 8, 9, 16, 17, 37, 38, 39) provided, on one hand, at the level of the feed ducts (2, 3) for the initial mixture and the gas, and on the other hand, at the exit from the expanding device (A) and the freezing system (B), these sensors being connected to the computer means (40) to correct the servo-control of the texture of the product (temperature, viscosity), of the quantity of gas, in particular of expanding air introduced at the expanding device (A), of the exit pressure in the channels (36) and that of the final output obtained at the exit from the freezing system (B), and to adjust the characteristics of this product in line with predetermined values.

11. An installation according to claim 8, characterized in that a feed duct (11) for viscous liquid or solid additives is provided at the level of the expanding device (A), these additives being sucked up by a dosing pump (12) or poured out by a dosing pump (12) connected to the computer means (40).

12. An installation according to claim 8, characterized in that the screw (25A) has a thread means (31A) a depth (30A) of which increases in a direction of advancement of the product.

13. An installation according to claim 12, characterized in that the depth (30A) of the thread means increases in relation to a reduction in pitch of the screw (25A), in such a way that a volume transported remains constant along a whole length of the screw (25A).

14. An installation for the making of food products, in particular expanded food products such as ice cream, comprising a freezing system (B) to cool and homogenise the product before transportation to a packing system, this freezing system being made up of a cylindrical chamber forming a double-casing means, inside which a refrigerating fluid circulates, and an agitating means, which is mounted for rotation inside the cylinder, the installation characterized in that the agitating means in the cylindrical chamber comprises an Archimedes' screw (25) provided on its periphery with scraper knife means (32) aligned in a longitudinal direction of the screw and touching an internal surface of the cylindrical chamber, the installation further characterized in that upstream of a part (25B2) of the screw (25) formed with a thread means, the screw (25) includes a part provided with longitudinal knife means and central movable elements.

15. An installation according to claim 14, characterized in that the central movable elements are paddle means.

16. An installation according to claim 8, characterized by a junction means (43) at the exit from the freezing system (B), the junction means (43) connected in return (45) to an entrance (44) of this freezing system (B) in order to seed the product to be treated in this freezing system with parts of the already frozen product.

17. An installation according to claim 3, characterized by a junction means (43) at the exit from the freezing system (B), the junction means (43) connected in return (45) to an entrance (44) of this freezing system (B) in order to seed the product to be treated in this freezing system with parts of the already frozen product.

18. An installation according to claim 17, characterized in that the junction means (43, 45) is connected to a feed duct means (15) for the freezing system (B).

19. An installation according to claim 17, characterized in that the junction means (43, 45) is connected to an upstream end of the cylindrical chamber.

20. An installation according to claim 17, characterized in that the product downstream of the recirculation junction means (43) is recovered by an exit pump means (47) and its motor means (48).

21. An installation according to claim 20, characterized in that the exit pump means is replaced in position and in function by a non-return valve means.

22. An installation for the making of food products, in particular expanded food products such as ice cream, comprising a freezing system (B) to cool and homogenise the product before transportation to a packing system, this freezing system being made of a cylindrical chamber forming a double-casing, inside which a refrigerating fluid circulates, and agitating means, which is mounted for rotation inside the cylinder, the installation characterized in that the agitating means in the cylindrical chamber comprise an Archimedes' screw (25) provided on its periphery with scraper knife means (32) aligned in a longitudinal direction of the screw and touching an internal surface of the cylindrical chamber, the installation further characterized in that the freezing system (B) is fed with an expanded product issuing from an expanding device itself fed with the product in non-expanded form and with an expanding gas, this expanding device comprising part of a feed duct (15, 100, 101, 102) for the freezing system (B) equipped with a microperforated gas injection pipe (105).

23. An installation according to claim 22, characterized in that the gas injection pipe (105) is situated at an elbow of the duct (15, 100, 101, 102) and works in a direction of flow of the product (104') or against the flow of the product (104).

24. An installation for the making of food products, in particular expanded food products such as ice cream, comprising a freezing system (B) to cool and homogenize the product before transportation to a packing system, this freezing system being made up of a cylindrical chamber forming a double-casing, inside which a refrigerating fluid circulates, and an agitating means, which is mounted for rotation inside the cylinder, the installation characterized in that the agitating means in the cylindrical chamber comprises an Archimedes' screw (25) provided on its periphery with scraper knife means (32) aligned in a longitudinal direction of the screw and touching an internal surface of the cylindrical chamber, the installation further characterized in that the double-walled cylindrical chamber has an auxiliary feed duct means (21) for food additives and a dosing means (22) for controlling the quantities of the food additives, with the food additives being transmitted through the auxiliary feed duct means (21) to an auxiliary chamber (18) which is in communication with the double-walled cylindrical chamber and which is fitted with an agitator means (20).

* * * * *